Feb. 18, 1936.     C. P. NINEKIRK     2,031,176
CHILD'S PLAY VEHICLE
Filed Dec. 7, 1934
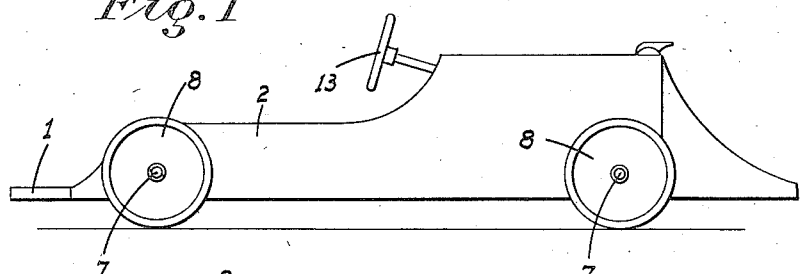
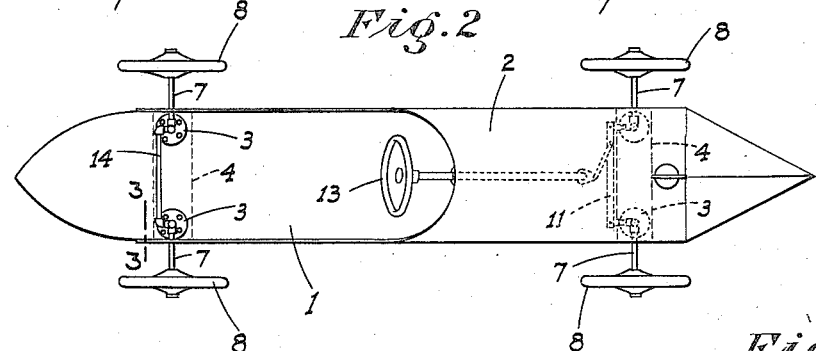
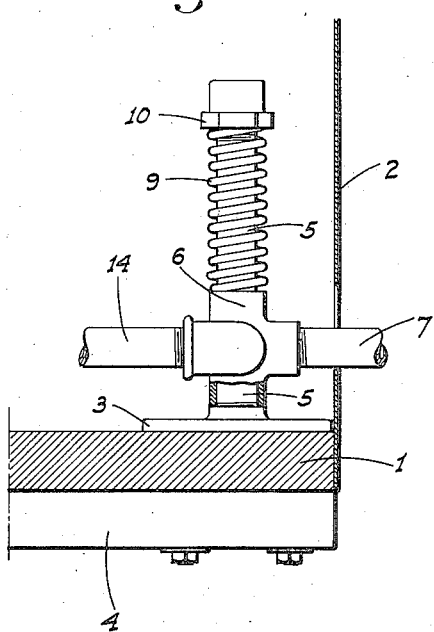
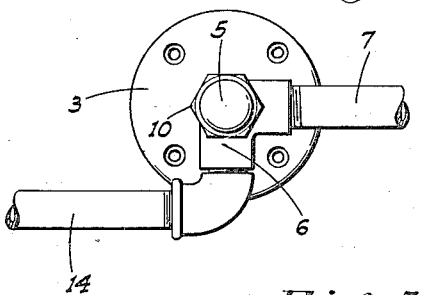
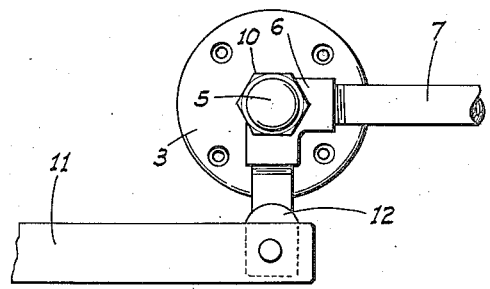
INVENTOR
Chester P. Ninekirk
BY
Harry C. Schroeder
ATTORNEY Patented Feb. 18, 1936

2,031,176

UNITED STATES PATENT OFFICE 2,031,176

CHILD'S PLAY VEHICLE

Chester P. Ninekirk, Berkeley, Calif.

Application December 7, 1934, Serial No. 756,485

4 Claims. (Cl. 280—87.5)

This invention relates to children's play vehicles of the "kiddie car" type, and particularly to a four-wheeled steerable vehicle, simulating an automobile, but having no propelling mechanism.

My main object is to provide a vehicle of this character in which the wheels are so mounted that the occupant is supported at a level below that of the wheel axles. In other words, the body of the vehicle is underslung, so that the vehicle will not upset even on a sharp turn and thus making it very safe for children's use.

A further object is to arrange the floor board of the vehicle relative to the rear wheels and the upstanding body thereof so that one child may conveniently stand on the rear end of the board on one foot while pushing on the ground with the other; while another child occupies a position in front of the one standing, and steers the vehicle.

The above objects are carried out by means of the structure now to be described and shown in the accompanying drawing, in which: Figure 1 is a side elevation of the vehicle; Figure 2 is a top plan view of the same; Figure 3 is an enlarged fragmentary transverse section on line 3—3 of Figure 2; Figure 4 is a plan view of a rear wheel mounting, and Figure 5 is a similar view of a front wheel mounting.

On the drawing, 1 denotes a board of suitable dimensions, forming both the floor seat, and frame of the vehicle. An upstanding body and engine hood simulating member 2 is mounted on the board, said member extending to the front end of the board but terminating short of the rear end thereof, and arranged to present a racy and pleasing appearance. It is this arrangement which allows the second object of my invention to be performed.

At points near the opposite ends of the board 1, floor-flanges 3 in pairs are secured on the upper face of the board near its side edges, the board in the plane of said flanges being reinforced by cross cleats 4 thereunder.

Each flange supports an upstanding stem 5, on which a four-way T-fitting 6 is slidably disposed, the runs of the T's engaging the stems and forming sleeves thereon. One outlet from each T projects laterally and outwardly, and rigidly supports a wheel spindle 7 on which a wheel 8 of suitable design is turnably mounted.

Disposed about each stem 5 above the T thereon is a compression spring 9, confined between the T and an adjustable nut 10 or similar member on the upper end of the stem. It will also be noted that each wheel is independently sprung. The vehicle is thus spring-supported from the wheels.

The T's of the front-wheel spindles are connected for simultaneous turning, for steering purposes, by a cross link 11 pivoted on short arms 12 secured in and projecting rearwardly from the other T-outlets. Any suitable steering connection may be made between the link and the steering wheel 13 facing rearwardly of the vehicle and disposed at a convenient point intermediate its ends. The connection of the cross member with the T's is, however, such that each of the T's may move axially of its stem independently of the other T.

The T's of the rear-wheel spindles are rigidly held from turning by cross members 14 mounted in connection with the rear outlets of said T's.

From the above description, it will be seen that the vehicle may be very cheaply yet substantially made; stock pipe fittings lending themselves well for use as wheel-mounting parts.

What I claim is:

1. In a child's play vehicle, a floor board, a pair of vertically disposed stems rigidly secured to said board adjacent one end thereof, tubular sleeves slidably mounted on the said respective stems, each sleeve having relative spaced angularly disposed arms extended radially therefrom, one arm of each sleeve being projected laterally with respect to said board, wheel spindles extending from the laterally projected arms, rigid means connecting the other arms of the sleeves, and means for maintaining a yieldable downward pressure upon each sleeve.

2. In a child's play vehicle, a floor board, a pair of vertically disposed stems rigidly secured to said board adjacent one end thereof, tubular sleeves slidably mounted on the respective stems, each sleeve having two radially disposed arms arranged at right angles with respect to each other, one arm of each sleeve being normally projected laterally with respect to said board, wheel spindles extending from the laterally projected arms, means for maintaining a yieldable downward pressure upon each sleeve, and a cross member rigidly connected to the other arms of the respective sleeves in such manner that each sleeve is free to move axially of its stem independently of the other sleeve.

3. In a child's play vehicle, a floor board, a pair of vertically disposed stems rigidly secured to said board adjacent one end thereof, tubular sleeves slidably mounted on said respective stems, each sleeve having relatively spaced angularly disposed arms extended radially therefrom, one arm of each sleeve being normally projected laterally with respect to said board, wheel spindles extending from the laterally projected arms, short members rigidly secured to the other arms of the respective sleeves, a steering link having its ends pivotally connected with the respective short members, and means for maintaining a yieldable downward pressure upon each sleeve.

4. In a child's play vehicle, a floor board, a pair of vertically disposed stems rigidly secured to said board adjacent one end thereof, tubular sleeves slidably mounted on the said respective stems, each sleeve having radially extended arms arranged at right angles with respect to each other, one arm of each sleeve being normally projected laterally with respect to said board, wheel spindles extending from the laterally projected arms, short members rigidly secured to the other tubular arms of the respective sleeves and normally projected longitudinally with respect to said board, a rigid link arranged trnsversely of the board and having its ends pivotally connected with the rear ends of said short arms, means for moving said link transversely of the board in such manner as to effect rotation of the sleeves, and means for maintaining a yieldable downward pressure upon each sleeve.

CHESTER P. NINEKIRK.